United States Patent
Chaussinand et al.

(10) Patent No.: US 11,345,229 B2
(45) Date of Patent: May 31, 2022

(54) FUEL TANK COMPRISING A TEMPERATURE SENSOR

(71) Applicant: Plastic Omnium Advanced Innovation and Research, Brussels (BE)

(72) Inventors: Antoine Chaussinand, Brussels (BE); David Hill, Commerce Township, MI (US)

(73) Assignee: Plastic Omnium Advanced Innovation and Research, Brussels (BE)

(*) Notice: Subject to any disclaimer, the term of this patent is extended or adjusted under 35 U.S.C. 154(b) by 0 days.

(21) Appl. No.: 16/771,135

(22) PCT Filed: Dec. 20, 2018

(86) PCT No.: PCT/EP2018/086322
§ 371 (c)(1),
(2) Date: Jun. 9, 2020

(87) PCT Pub. No.: WO2019/122201
PCT Pub. Date: Jun. 27, 2019

(65) Prior Publication Data
US 2021/0008975 A1 Jan. 14, 2021

(30) Foreign Application Priority Data

Dec. 20, 2017 (EP) .................................. 17209095
Apr. 24, 2018 (EP) .................................. 18169059

(51) Int. Cl.
*G01K 1/00* (2006.01)
*G01K 13/00* (2021.01)
(Continued)

(52) U.S. Cl.
CPC .......... *B60K 15/03* (2013.01); *B60R 16/0207* (2013.01); *G01K 1/08* (2013.01);
(Continued)

(58) Field of Classification Search
CPC .. G01K 1/14; G01K 1/08; G01K 1/16; G01K 13/02; G01K 2013/024; G01K 2013/026;
(Continued)

(56) References Cited

U.S. PATENT DOCUMENTS 5,070,706 A * 12/1991 Waters .................... G01K 13/02
62/129
2007/0222046 A1 9/2007 Tokunaga
(Continued)

FOREIGN PATENT DOCUMENTS

CN 201034750 Y 3/2008
CN 102818645 A * 12/2012 ............... G01K 7/16
(Continued)

OTHER PUBLICATIONS

Rack, H.J. "Physical and mechanical properties of cast 17-4 PH stainless steel" (1981). Sandia National Laboratories, pp. 1-65. (Year: 1981).*
(Continued)

*Primary Examiner* — Mirellys Jagan
(74) *Attorney, Agent, or Firm* — Oblon, McClelland, Maier & Neustadt, L.L.P.

(57) ABSTRACT

Fuel tank (1) having: a wall (12) defining an internal volume (20) of the tank, and a temperature sensor (4) located inside the internal volume of the tank and at least partially enveloped with a material (21) having a thermal diffusivity comprised between $2\times10^{-7}$ and $2\times10^{-5}$ m$^2$/s at 20° C. The temperature sensor measure an internal tank temperature, such as a vapor dome temperature.

14 Claims, 2 Drawing Sheets

(51) Int. Cl.
  *B60K 15/03*     (2006.01)
  *B60R 16/02*     (2006.01)
  *G01K 1/08*      (2021.01)
  *G01K 1/14*      (2021.01)
  *G01K 1/16*      (2006.01)

(52) U.S. Cl.
  CPC ............... *G01K 1/14* (2013.01); *G01K 1/16* (2013.01); *B60K 2015/0321* (2013.01); *B60K 2015/03486* (2013.01)

(58) Field of Classification Search
  CPC ........ G01K 1/143; G01K 1/146; B60K 15/03; B60K 2015/03486; B60K 2015/0321; B60R 16/0207
  See application file for complete search history.

(56) References Cited

U.S. PATENT DOCUMENTS

| | | | |
|---|---|---|---|
| 2009/0025805 A1 | 1/2009 | Makino et al. | |
| 2010/0154534 A1* | 6/2010 | Hampton | G01F 23/265 73/304 C |
| 2010/0288377 A1* | 11/2010 | Habibi | G01L 19/0007 137/511 |
| 2015/0192478 A1* | 7/2015 | Rueth | G01K 1/14 374/143 |
| 2017/0211530 A1 | 7/2017 | Fukuoka et al. | |
| 2018/0073950 A1* | 3/2018 | Bae | G01K 1/08 |
| 2020/0376952 A1* | 12/2020 | Chaussinand | B60K 15/03 |

FOREIGN PATENT DOCUMENTS

| | | |
|---|---|---|
| CN | 203450642 U | 2/2014 |
| CN | 107054923 A | 8/2017 |
| DE | 10 2006 034 210 A1 | 1/2008 |
| GB | 2 284 581 A | 6/1995 |
| JP | 11-294284 A | 10/1999 |
| JP | 2001-138758 | 5/2001 |
| JP | 2016-95181 A | 5/2016 |
| WO | WO 2017/028836 A1 | 2/2017 |

OTHER PUBLICATIONS

International Search Report dated Apr. 3, 2019 in PCT/EP2018/086322 filed on Dec. 20, 2018.
WEMAUSA: "Fuel/Water Temperature Sensors", 2013, XP055511116, Retrieved from the Internet:URL:https://web.archive.org/web/20130107054645/http://www.wemausa.com/temperature/temperature_sensor.shtm 1, 1 page.
Wagner et al., "Analysis of Thermal Diffusivity of Metals using Lock-in Thermography", Proceedings of the 2016 International Conference on Quantitative Infrared Thermography, 2016, XP055511036, 7 total pages.

* cited by examiner

FUEL TANK COMPRISING A TEMPERATURE SENSOR

TECHNICAL FIELD

The invention relates to tanks for liquids, such as vehicle fuel tanks.

Fuel tanks comprising a temperature sensor which is located inside an internal volume of the fuel tank in order to measure an internal tank temperature, such as a vapor dome temperature, are known in the art. By conception, the temperature measurement can be submitted to noises. For example, the measurement of a vapor dome temperature of a fuel tank may be noisy due to the impact of the thermal conductivity of wires connected to the temperature sensor or to the impact of the sloshing of the fuel contained in the tank for example while the vehicle is moving.

SUMMARY OF THE INVENTION

The present invention aims to provide an improved fuel tank.

The invention relates to a fuel tank comprising:
a wall defining an internal volume of the tank, and
a temperature sensor located inside the internal volume of the tank and at least partially enveloped with a material having a thermal diffusivity comprised between $2 \times 10^{-7}$ and $2 \times 10^{-5}$ m$^2$/s at 20° C.

Such a material forms a "thermal mass" which is capable to improve the correlation between the actual temperature of the internal volume of the tank and the associated signal communicated by the temperature sensor. The characteristics of the material allow to reduce the noise by improving the inertia of the temperature around the sensor. Thus, the temperature measured by the sensor is filtered to a more representative value as the sensor is less influenced by punctual increase or decrease of the sensed temperature due for example to the impact of the thermal conductivity of wires connected to the temperature sensor or to the impact of the sloshing of the fuel contained in the tank.

Thermal diffusivity of a material is a well-known value which may be obtained using the following formula:

$$\text{Thermal diffusivity}(D) = \frac{k}{\rho \times Cp}$$

where "k" is thermal conductivity (W·m$^{-1}$·K$^{-1}$), "$\rho$" is density (kg·m$^{-3}$), and "Cp" is specific heat capacity (J·kg$^{-1}$·K$^{-1}$) of the material.

Further, the fuel tank of the invention allows to improve a fuel system leak detection when this detection is based on the temperature of an internal volume of the tank.

The term "fuel tank" is understood to mean an impermeable tank that can store a liquid such as fuel under diverse and varied environmental and usage conditions. An example of this tank is that with which a motor vehicle is equipped. The fuel tank according to the invention is preferably made of plastic (i.e. its wall is principally made of plastic). The term "plastic" means any material comprising at least one synthetic resin polymer. Any type of plastic may be suitable. Particularly suitable are plastics that belong to the category of thermoplastics.

The term "thermoplastic" is understood to mean any thermoplastic polymer, including thermoplastic elastomers as well as blends thereof. The term polymer is understood to mean both homo- and copolymers (especially binary and ternary copolymers). Examples of such copolymers are, without being limited to, random copolymers, linear block copolymers, other block copolymers and grafts copolymers.

Advantageously, the material has a thickness comprised between 0.1 and 20 mm.

The lower the thermal diffusivity of a material is, the less thick said material is in order to achieve an efficient temperature filtering action. For example, a material having a thermal diffusivity of $2 \times 10^{-7}$ m$^2$/s at 20° C. has an efficient filtering action with a thickness of 0.1 mm Preferentially, the temperature sensor has a thermal inertia and the material has a thermal inertia according to the following formula:

$$\frac{1}{3} < \frac{\text{thermal inertia of the temperature sensor}}{\text{thermal inertia of the temperature sensor} + \text{thermal inertia of the material}} < 1.$$

Thermal inertia is a value well-known by the person skilled in the art. The thermal inertia of a component may for example be obtained by the following formula: mass× specific heat capacity (Cp) of the material of said component.

This ratio ensures good filtering properties of the material. The skilled person is able to choose a material which is adapted to the features of the temperature sensor, i.e. a material having a thermal inertia which allows the above ratio to be fulfilled.

Advantageously, the temperature sensor is totally enveloped with the material.

The temperature filtration by the material is therefore more important and the resulting measurement is more reliable.

In one embodiment, the material forms a coating enveloping at least partially the temperature sensor.

In such an embodiment, the thickness of the material is preferably comprised between 0.1 and 10 mm. The material may form a coating totally enveloping the temperature sensor.

In another embodiment, the material forms a housing for housing at least partially the temperature sensor.

In such an embodiment, the thickness of the material is preferably comprised between 1 and 20 mm. The material may have the form of a sleeve comprising a cavity able to house the temperature sensor. The material may form a housing for housing all of the temperature sensor.

Preferably, the material is a steel.

Steel may have for example a thermal diffusivity of $1{,}172 \times 10^{-5}$ m$^2$/s.

Advantageously, the material is a stainless steel.

Stainless steel may have for example a thermal diffusivity of $3{,}352 \times 10^{-6}$ m$^2$/s. Of course, any other material having a thermal diffusivity comprised between $2 \times 10^{-7}$ and $2 \times 10^{-5}$ m$^2$/s at 20° C. may be used.

In an embodiment, the temperature sensor is attached to the tank via a support.

The support may be for example of the dovetail joint or clip type. The support may be placed on the wall of the tank during the manufacture of the tank, for example during a twin sheet blow molding (TSBM) process or by welding. Other types of supports may be used.

In one preferred embodiment, the tank further comprises a pressure sensor having a pressure port, the temperature sensor being attached to the pressure port of the pressure sensor.

In an embodiment, the temperature sensor is welded to the tank.

In an embodiment, the tank further comprises a fuel delivery module, the temperature sensor being attached to the fuel delivery module.

The sensor may be directly attached to the fuel delivery module or may be mounted on a support which is attached to the fuel delivery module.

Advantageously, the fuel tank further comprises an electrical wire and an electronical board, wherein the electrical wire connects the temperature sensor to the electronical board, at least a portion of the electrical wire contiguous to the temperature sensor being enveloped with the material.

Thus, the impact of the thermal conductivity of the electrical wire is further limited.

Preferably, the tank comprises an electrical wire or the electrical wire as described above, an electronical board or the electronical board as described above, and a pressure sensor assembly having a pressure port forming a hole through the wall of the tank or the pressure sensor having a pressure port as described above, wherein the electrical wire connects the temperature sensor to the electronical board through the pressure port.

The invention also relates to a vehicle comprising a fuel tank as described above.

BRIEF DESCRIPTION OF THE DRAWINGS

The above and other characteristics, features and advantages of the present invention will become apparent from the following detailed description, taken in conjunction with the accompanying drawings, which illustrate, by way of examples, the principles of the invention. The reference figures quoted below refer to the attached drawings wherein.

Figure 1:
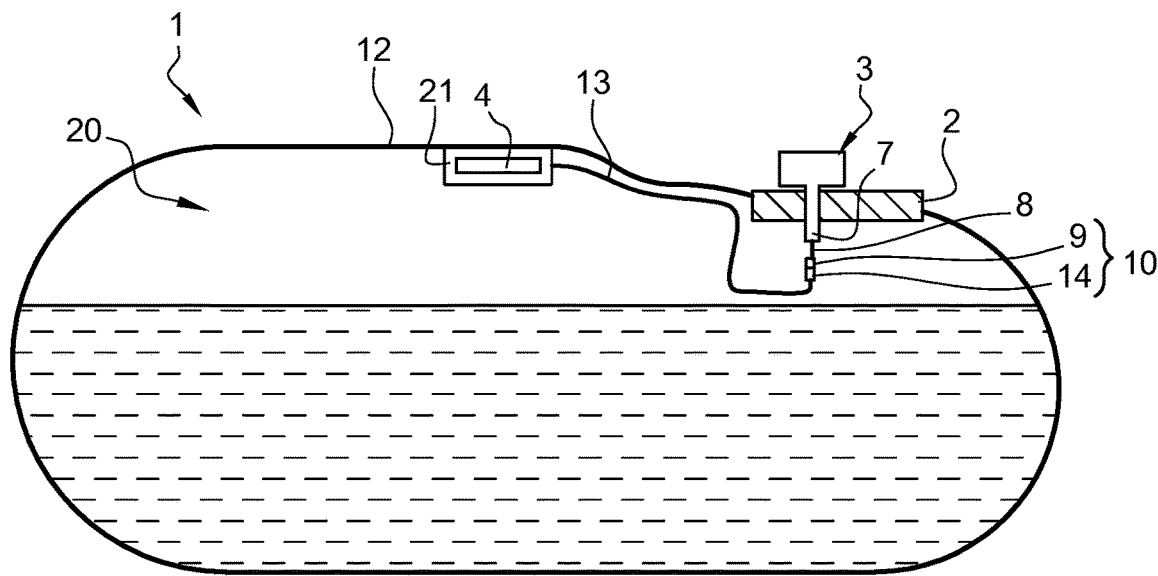
FIG. 1 is a schematic side view of a first embodiment of a tank according to the invention.

The present invention will be described with respect to particular embodiments and with reference to certain drawings but the invention is not limited thereto. The drawings described are only schematic and are non-limiting. In the drawings, the size of some elements may be exaggerated and not drawn on scale for illustrative purposes.

DETAILED DESCRIPTION OF THE INVENTION

First Embodiment (FIG. 1)

The fuel tank 1 comprises a flange 2, a pressure sensor assembly 3 mounted on the flange, and a temperature sensor 4.

In the present embodiment, the wall 12 of the fuel tank 1 is made of a thermoplastic material. The wall 12 of the tank 1 defines an internal volume 20 of the tank 1.

The pressure sensor assembly 3 is showed in a schematic view in FIG. 1 wherein not all of the components comprised in this assembly are represented. However, the pressure sensor assembly 3 of this embodiment is similar to the pressure sensor assembly 3 of the second embodiment (see FIG. 2). Thus, the numerical references used for the components of the pressure sensor assembly 3 of the second embodiment are also used below for the description of the first embodiment.

The pressure sensor assembly 3 comprises a pressure sensor 5 which is capable of measuring a pressure. The pressure sensor assembly 3 also comprises an electronical board 6 for pressure signal acquisition, temperature signal acquisition, and the creation of a SENT message and the sending of this message to an electronic control unit (ECU) (not shown). Of course, the electronical board 6 may be capable of creating other types of messages such as CAN or LIN messages for example. The pressure sensor assembly 3 comprises a pressure port 7. The pressure port 7 has the general form of a hollow pillar and the interior of the pressure port 7 forms a hole through a top portion of the wall 12 of the tank 1. The pressure sensor assembly 3 further comprises a sealing element 17 surrounding a major portion of a median outer surface of the pressure port 7, thus ensuring a good sealing of the hole in the wall 12 of the tank 1 through which the pressure port 7 is introduced.

An electrical wire 8 connected to the electronical board 6 extends from said electronical board 6 to the inside 20 of the tank 1 through the hole formed by the pressure port 7. This electrical wire 8 is connected at its end ending in the inside 20 of the tank 1 to a female part 9 of a connector 10.

The temperature sensor 4 is located inside the internal volume 20 of the tank 1. The temperature sensor 4 is attached to an inner side of a top portion of the tank wall 12. The temperature sensor 4 comprises an electrical wire 13 which is connected, at its end which is not connected to the temperature sensor, to a male part 14 of the connector 10. The temperature sensor is totally enveloped with a material 21 having a thermal diffusivity comprised between $2 \times 10^{-7}$ and $2 \times 10^{-5}$ e/s at 20° C. and a thickness comprised between 0.1 and 20 mm. Such a material 21 is capable of improving the correlation between the actual temperature in an internal volume 20 of the tank 1 and the associated signal communicated by the temperature sensor 4. In the present embodiment, the material 21 is stainless steel. Of course, any other material 21 having thermal diffusivity and thickness values as defined above, such as 1 mm of ordinary steel, would be suitable for the enveloping of the temperature sensor 4.

In the present embodiment, a portion of the wire 13 contiguous to the temperature sensor 4 is also enveloped with the material 21. Of course, it may be provided that this portion is not enveloped with the material 21.

Thus, the connector 10 is made of two parts: a female part 9 of the connector 10 and a male part 14 of the connector 10.

The female part 9 and the male part 14 of the connector 10 are connected together so that the temperature sensor 4 can send a signal to the electronical board 6. Of course, it can be provided that the electrical wire 8 connected to the electronical board 6 is connected to the female part of the connector 10 and that the wire 13 connected to the temperature sensor 4 is connected to the male part of the connector 10.

Figure 2:
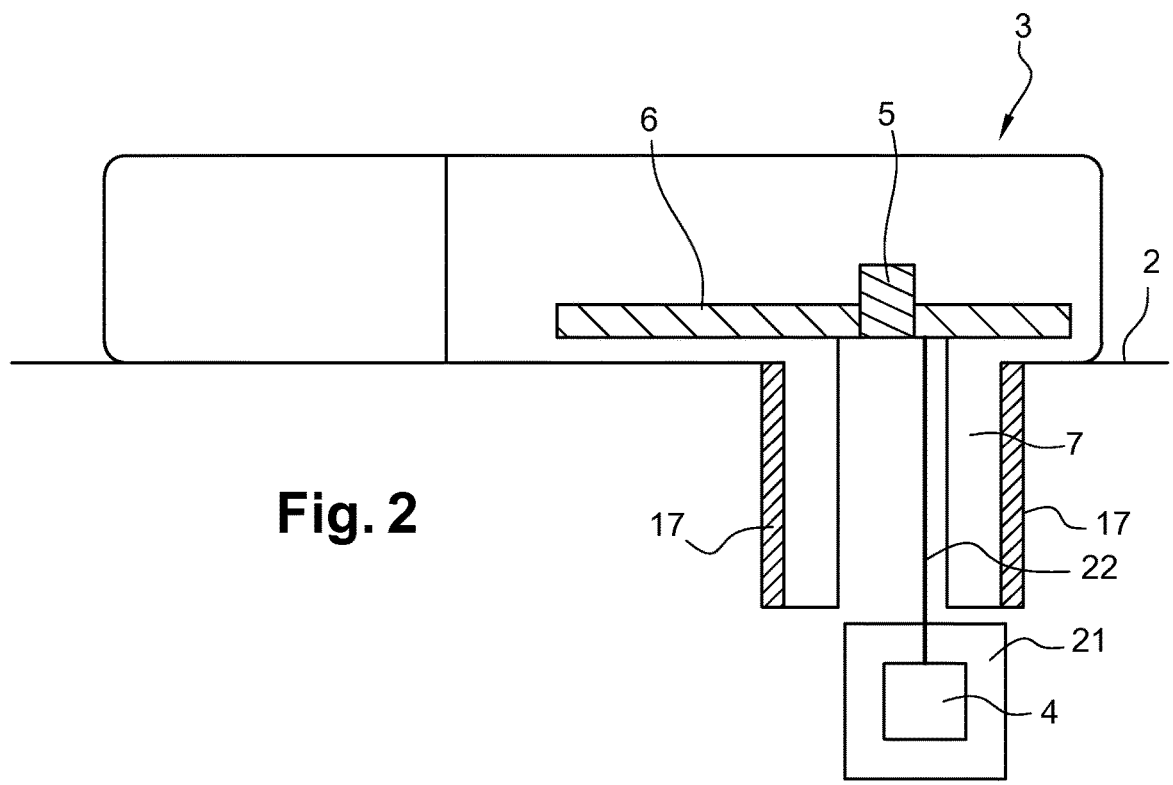
FIG. 2 is a schematic side view of a portion of a second embodiment of a fuel tank according to the invention.

Second Embodiment (FIG. 2)

All the features of the tank 1 of this embodiment are identical to those of the first embodiment except that the temperature sensor is attached to the tank 1 at the vicinity of the pressure port 7, which allows the use of a single electrical wire 22 and no connector.

Alternatively, the temperature sensor 4 may be directly or indirectly attached to the pressure port. In one particular embodiment, the temperature sensor 4 may be attached to an inner side of the pressure port 7. In another particular embodiment, the temperature sensor 4 may be attached to the outer side of the pressure port 7.

Figure 3:
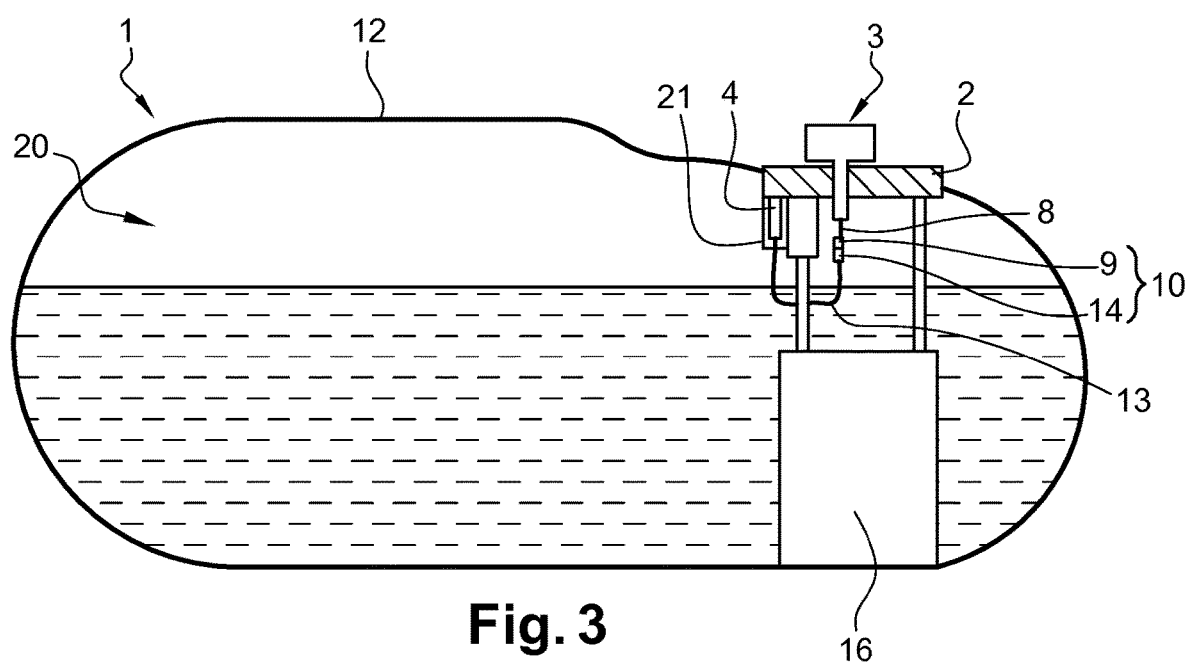
FIG. 3 is a schematic side view of a third embodiment of a tank according to the invention.

Third Embodiment (FIG. 3)

All the features of the tank 1 of this embodiment are identical to those of the first embodiment except that the temperature sensor 4 is not directly attached to the wall 12 of the tank 1 but is attached to a fuel delivery module 16. This module is located inside the tank and comprises various organs such as a pump and a meter for transferring predetermined amounts of fuel outside the tank to a vehicle motor.

Whilst the principles of the invention have been set out above in connection with specific embodiments, it is to be understood that this description is merely made by way of example and not as a limitation of the scope of the invention which is determined by the appended claims.

For example, the temperature sensor of the invention is not necessarily connected to an electronical board of a pressure sensor assembly or does not necessarily pass through the pressure port of a pressure sensor assembly.

Further, the temperature sensor is not necessarily connected to the pressure sensor assembly using a connector but may be connected to it by any other means known by the skilled person.

Forming a coating or housing are not the only ways to envelop the temperature sensor with the material, there are other ways, for instance, the material may be overmolded, welded, soldered, glued or clamped onto the temperature sensor. The temperature sensor of the invention may also be impregnated by dipping in the material.

The invention claimed is:
1. A fuel tank comprising:
a wall defining an internal volume of the fuel tank, the wall having a top portion, a down portion, and a lateral portion, and
a temperature sensor located inside the internal volume of the fuel tank and attached to an inner side surface of the top portion of the tank wall, the temperature sensor being at least partially enveloped with a material having a thermal diffusivity comprised between $2 \times 10^{-7}$ and $2 \times 10^{-5}$ m$^2$/s at 20° C.,
wherein the temperature sensor has a thermal inertia and the material has a thermal inertia according to the following formula:

$$\frac{1}{3} < \frac{\text{thermal inertia of the temperature sensor}}{\text{thermal inertia of the temperature sensor} + \text{thermal inertia of the material}} < 1.$$

2. The fuel tank according to claim 1, wherein the material has a thickness comprised between 0.1 and 20 mm.
3. The fuel tank according to claim 1, wherein the temperature sensor is totally enveloped with the material.
4. The fuel tank according to claim 1, wherein the material forms a coating enveloping at least partially the temperature sensor.
5. The fuel tank according to claim 1, wherein the material forms a housing for housing at least partially the temperature sensor.
6. The fuel tank according to claim 1, wherein the material is a steel.
7. The fuel tank according to claim 1, wherein the material is a stainless steel.

8. The fuel tank according to claim 1, wherein the temperature sensor is attached to the fuel tank via a support.
9. The fuel tank according to claim 1, wherein the temperature sensor is welded to the fuel tank.
10. The fuel tank according to claim 1, further comprising an electrical wire and an electronical board, wherein the electrical wire connects the temperature sensor to the electronical board, and at least a portion of the electrical wire is contiguous to the temperature sensor being enveloped with the material.
11. A vehicle comprising a fuel tank according to claim 1.
12. A fuel tank comprising:
a wall defining an internal volume of the fuel tank,
a temperature sensor located inside the internal volume of the fuel tank and at least partially enveloped with a material having a thermal diffusivity comprised between $2 \times 10^{-7}$ and $2 \times 10^{-5}$ m$^2$/s at 20° C.,
an electrical wire,
an electronical board, and
a pressure sensor having a pressure port forming a hole through the wall of the fuel tank or the pressure sensor having a pressure port, wherein the temperature sensor is attached to the pressure port of the pressure sensor,
wherein the electrical wire connects the temperature sensor to the electronical board through the pressure port.
13. A fuel tank comprising:
a wall defining an internal volume of the tank, the wall having a top portion, a down portion, and a lateral portion,
a temperature sensor located inside the internal volume of the tank and at least partially enveloped with a material having a thermal diffusivity comprised between $2 \times 10^{-7}$ and $2 \times 10^{-5}$ m$^2$/s at 20° C.,
wherein the temperature sensor has a thermal inertia and the material has a thermal inertia according to the following formula:

$$\frac{1}{3} < \frac{\text{thermal inertia of the temperature sensor}}{\text{thermal inertia of the temperature sensor} + \text{thermal inertia of the material}} < 1,$$

and
a fuel delivery module located inside the tank, wherein the temperature sensor is attached to the fuel delivery module and said fuel delivery module comprises a pump and a meter for transferring predetermined amounts of fuel outside of the tank to a vehicle motor.
14. A fuel tank comprising:
a wall defining an internal volume of the tank, the wall having a top portion, a down portion, and a lateral portion,
a temperature sensor located inside the internal volume of the tank and at least partially enveloped with a material having a thermal diffusivity comprised between $2 \times 10^{-7}$ and $2 \times 10^{-5}$ m$^2$/s at 20° C.,
wherein the temperature sensor has a thermal inertia and the material has a thermal inertia according to the following formula:

$$\frac{1}{3} < \frac{\text{thermal inertia of the temperature sensor}}{\text{thermal inertia of the temperature sensor} + \text{thermal inertia of the material}} < 1,$$

and
further comprising an electrical wire and an electronical board, wherein the electrical wire connects the temperature sensor to the electronical board, and at least a portion of the electrical wire is not enveloped with the material.

\* \* \* \* \*